UNITED STATES PATENT OFFICE.

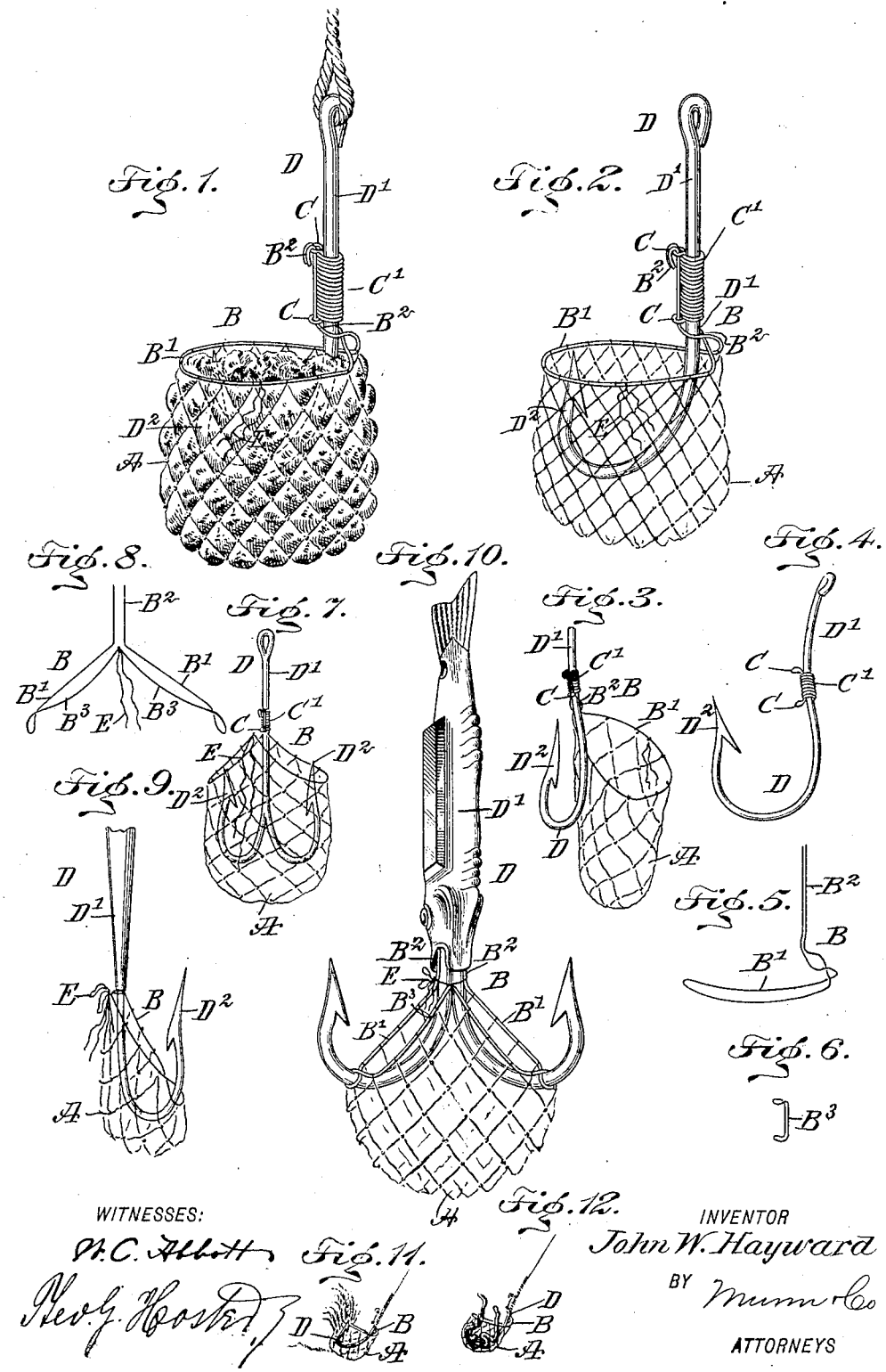

JOHN WILLIAM HAYWARD, OF ST. JOHNS, NEWFOUNDLAND.

ATTACHMENT FOR BAIT-HOOKS, JIGGERS, AND LIKE ANGLING DEVICES.

No. 856,867.  Specification of Letters Patent.  Patented June 11, 1907.

Application filed March 30, 1906. Serial No. 308,863.

*To all whom it may concern:*

Be it known that I, JOHN WILLIAM HAYWARD, a subject of the King of Great Britain, and a resident of St. Johns, Newfoundland, have invented a new and Improved Attachment for Bait-Hooks, Jiggers, and Like Angling Devices, of which the following is a full, clear, and exact description.

The invention relates to fishing, and its object is to provide a new and improved attachment for bait hooks, jiggers and like angling devices, arranged to prevent depredation of the dead bait, artificial bait or live bait by small fish, to allow convenient and safe use of the very choicest bait, such as mussels, cockles and other shell fish, as well as white fish, squids, herring pips and like entrails too soft to be strung on the hook; to prevent fouling of the hook on the bottom of the fishing grounds, and to securely hold the bait in place for any length of time, thus requiring no hauling of lines to see whether the hook is still baited or not.

The invention consists of novel features and parts and combinations of the same which will be more fully described hereinafter and then pointed out in the claims.

A practical embodiment of the invention is represented in the accompanying drawings forming a part of this specification, in which similar characters of reference indicate corresponding parts in all the views.

Figure 1 is a perspective view of the improvement as applied to an ordinary bait hook, the bait being in position; Fig. 2 is a like view of the same, showing the bait receptacle empty; Fig. 3 is a like, but somewhat reduced view of the improvement, showing the hook outside of the bait-bag to permit convenient filling of the bag with inanimate bait, and stringing the hook with live bait; Fig. 4 is a perspective view of the hook; Fig. 5 is a like view of the support or holder for the bait-bag; Fig. 6 is a perspective view of the eyelets for securing the shank of the support or holder for the bait-bag; Fig. 7 is a perspective view of the improvement as applied to a double hook; Fig. 8 is a perspective view of the bait receptacle holder for the double hook; Fig. 9 is a perspective view of the improvement as applied to a single hook jigger; Fig. 10 is a like view of the improvement as applied to a double hook jigger; Fig. 11 is a perspective view of the improvement as arranged with a fly by inserting a feather in the bait-bag; and Fig. 12 is a like view of the improvement as arranged with live bait strung on the hook contained within the bait-bag.

The improved attachment for angling devices consists, essentially, of a receptacle for the bait, preferably made in the form of a bag A of any suitable material, such as wire, gut, silk, linen or the like and knitted, woven, spun, netted or otherwise manufactured. As shown in the drawings the bag A has its open mouth attached to the loop B' of a support B, preferably made from a single piece of spring wire, the ends B² of which are engaged with a double eyelet the shank of which is ganged by thread or wire C' to the shank D' of the hook D. The loop B', as shown in Figs. 1, 2 and 5, extends approximately at right angles to the shank D' of the hook D and a distance above the point D² thereof, so that when the bag A is filled with bait, then the point D² of the hook D is concealed within the bait contained in the bag. This arrangement of the support B may, however, be varied as will be seen by reference to Figs. 3, 7, 9, and 10, on which the loop B' stands at an angle to the shank B².

By the arrangement described, the bag A may be filled with choice bait, such as mussels, cockles and other shell-fish, as well as white fish squibs, herring pips and like entrails too soft to be strung on the hook, the said bait bulging out through the open meshes of the material of which the bag A is made, so that the bag itself is rendered invisible to the fish.

If desired, the loop B' of the frame B may be closed to close the open mouth of the bag A, and for this purpose tie-strings E may be employed for connecting the sides of the loop B' with each other and for drawing the said sides into a closed position, it being understood that the spring wire of which the frame B is made allows such closing of the loop.

If desired, the hook D may be moved outside of the bag A as shown in Fig. 3, to allow of convenient filling of the bag A with inanimate bait and stringing of the hook D with live bait such as worms and the like. The hook D with the live bait thereon may be returned to the bag A in case the latter is left empty. See Fig. 12. As shown in Fig. 7, a bag A is applied to a double hook, and in this case the support is made double as plainly shown in Figs. 7 and 8, and the front 33 of the loop is adapted to open for the insertion of the bait into the bag and is adapted to be closed by the tie string E.

In the form shown in Fig. 9 the bag A is applied to a single hook jigger. In Fig. 10 the bag A is applied to a double hook jigger, and as shown in Fig. 11 a fly is made by inserting a feather in the bag A attached by the support to the shank of the hook, the same as above described.

It is understood that in angling large fish, the hook and bait are usually swallowed whole by the fish.

I do not limit myself to the particular shape and form of the bag and its support and the means for attaching the latter to the angling device, as the bag and support may be varied without deviating from the spirit of my invention.

Having thus described my invention, I claim as new and desire to secure by Letters Patent:—

1. An angling device provided with a flexible bag of reticulated material adapted to receive bait and arranged at the angling hook.

2. An attachment for fish hooks, jiggers and like angling devices, comprising a bait receptacle of flexible reticulated material, and means for attaching it to the angling device.

3. An attachment for fish hooks, jiggers and like angling devices, comprising a bag, and a support engaging the mouth of the bag and adapted to be fastened to the angling device.

4. An attachment for fish hooks, jiggers and like angling devices, comprising an open mesh fabric bag, a wire support engaging the mouth of the bag, and means for securing the said support to the angling device.

5. An attachment for fish hooks, jiggers and like angling devices, comprising an open mesh fabric bag, a wire support engaging the mouth of the bag, means for securing the said support to the fishing device, and means connected with the support for closing the mouth of the bag.

6. An attachment for hooks, jiggers and like angling devices, comprising a bag of an open mesh fabric for containing the bait and the hook, a wire frame having a loop on which the mouth of the bag is attached, and means for securing the wire frame to the shank of the angling device.

7. An attachment for a fish hook, comprising a bag for containing the bait, and a wire frame carrying the said bag, a double eyelet engaged by the ends of the wire frame, and means for fastening the eyelet in place in the shank of the hook.

8. An attachment for a double fish hook, comprising a bag for containing the bait, a wire frame attached to the shank of the hook, the said bag having its mouth attached to the said wire frame, one side of which can be opened for placing the bait into the bag, and means for holding the open side of the frame in a closed position.

9. The combination of a fish hook with a flexible pocket attached to the shank thereof, substantially as described.

10. The combination of a fish hook with a flexible pocket attached to the shank thereof with its open end turned toward the top of the hook, substantially as described.

11. The combination of a fish hook with a flexible open work pocket attached to the shank thereof and having its open end turned toward the top of the hook, substantially as described.

In testimony whereof I have signed my name to this specification in the presence of two subscribing witnesses.

JOHN WILLIAM HAYWARD.

Witnesses:
HENRY FRANCIS BRADHEAD,
A. DOUGLAS PARSONS.